(12) United States Patent
Komatsuzaki

(10) Patent No.: US 8,330,295 B2
(45) Date of Patent: Dec. 11, 2012

(54) UNINTERRUPTIBLE POWER SUPPLY AND METHOD FOR SELECTIVE TRIPPING THEREOF

(75) Inventor: Yoshihiro Komatsuzaki, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 549 days.

(21) Appl. No.: 12/588,626

(22) Filed: Oct. 22, 2009

(65) Prior Publication Data

US 2010/0102634 A1 Apr. 29, 2010

(30) Foreign Application Priority Data

Oct. 23, 2008 (JP) ................................. 2008-273609

(51) Int. Cl.
*H02J 9/00* (2006.01)

(52) U.S. Cl. .......................................... 307/64; 361/30
(58) Field of Classification Search ................... 307/64; 361/30
See application file for complete search history.

(56) References Cited

U.S. PATENT DOCUMENTS 5,745,355 A * 4/1998 Tracy et al. ................ 363/71
7,019,989 B2 * 3/2006 Kobayashi et al. ............. 363/37
7,733,616 B2 * 6/2010 Yamada ........................ 361/31
7,821,234 B2 * 10/2010 Moriya ........................ 320/134

FOREIGN PATENT DOCUMENTS

JP A-2006-109603 4/2006

OTHER PUBLICATIONS

Office Action dated May 3, 2012 in corresponding CN Application No. 200910207718.7 with English summary of Chinese Examiner's comment about Reference 2 enclosed from Japanese law firm.
Guo. "Knowledge-based networking UPS malfunction diagnosis expert system." *Chinese Excellent Master Thesis Electronic Periodical Publication Network*. Mar. 25, 2004: pp. 37-38.

* cited by examiner

*Primary Examiner* — Hal Kaplan
(74) *Attorney, Agent, or Firm* — Posz Law Group, PLC

(57) ABSTRACT

UPS performance failure is determined independently by itself. Selective tripping can be done within a shorter time than one cycle of an AC output. A UPS converts a DC voltage to an AC voltage and supplies the AC voltage to a load device. A UPS has a control unit identifying a resistance value of an internal resistance as an internal impedance of the UPS by using an instantaneous value of an internal voltage and current and conducting a failure determination by detecting abnormal fluctuation of the value. It is preferred that an identification of the internal impedance is done through a system identification unit.

11 Claims, 8 Drawing Sheets

UNINTERRUPTIBLE POWER SUPPLY AND METHOD FOR SELECTIVE TRIPPING THEREOF

CROSS-REFERENCE TO RELATED APPLICATION

The present application is related to, claims priority from, and incorporates by reference Japanese Patent Application No. 2008-273609, filed on Oct. 23, 2008. This application is also related to U.S. application Ser. No. 12/588,625, entitled "UNINTERRUPTIBLE POWER SUPPLY AND METHOD FOR TRIPPING THEREOF," filed simultaneously on Oct. 22, 2009 with the present application.

TECHNICAL FIELD

The present application relates to an uninterruptible power supply (abbreviated as UPS hereafter) and a method for selective tripping an uninterruptible power supply.

RELATED ART

A UPS is provided in a power source system to minimize an influence of power source fluctuation to a load device. Especially, a power source system requiring high stability includes plural UPSs (a first UPS, a second UPS, a third UPS . . . ) operated in a parallel redundancy condition as shown in FIG. 8 and configured as a backup power source having enough power source capacity compared to the capacity of a load device.

However, in a power source system in which plural UPSs are operated in a parallel redundancy condition as discussed above, when a UPS breaks down or fails (hereinafter fails), its breakdown, fault, or failure (hereinafter failure) influence affects plural other "good" UPSs connecting to common bus lines. As a result, the plural other "good" UPSs may also run down or stop as a chain reaction. Since failure of a UPS affects an entire power source system, there is a possibility that a load device may run down or stop as well even though the power source system has a backup power source. In order to prevent the above described problems, a technology referred to as "selective tripping" is proposed. The selective tripping means that a failed UPS is selectively removed (tripped) from a power source system (bus), and other "good" UPSs keep operating in a parallel redundancy condition.

It is desirable that each UPS connecting to a power source system in parallel detects that its own performance is indicative of failure and removes itself from the power source system (bus) for conducting selective tripping. In other words, each UPS determines failure of its own performance based on its own internal information without sharing common power source and current information with other UPSs and removes itself from a power source system in case of its own failure. The following related art with respect to the expectation described above is known.

Related Art 1
U.S. Pat. No. 5,745,355A (WO09750169A1, JP2000-513472A) (related art 1) discloses that each UPS detects its own output voltage $v0(t)$ and an inductor current $is(t)$, which is a current flowing through an inductor inserted in a main circuit in series, and generates a one cycle-delay voltage $v0(t-T0)$, which is a voltage after one cycle from the output voltage $v0(t)$, and a one cycle-delay inductor current $is(t-T0)$, which is an inductor current after one cycle from the inductor current $is(t)$. Each UPS determines its own failure by multiplying differences between the detected output voltage $v0(t)$ and the generated one cycle-delay output voltage $v0(t-T0)$, and the detected inductor current $is(t)$ and the generated one cycle-delay inductor current $is(t-T0)$, respectively, as shown in the following series of formulas:

$$\Delta v0(t):=v0(t)-v0(t-T0) \quad (1)$$

$$\Delta is(t):=is(t)-is(t-T0) \quad (2)$$

if $\Delta v0(t)\times\Delta is(t)>$threshold value, then Fault=1, else
Fault=0    (3)

Namely, in formula (3), when a left term value exceeds a threshold value, a value of a failure determination signal, called as a fault signal, is set as "1." When a left term value does not exceed a threshold value, a value of a fault signal is set as "0." When the Fault value is "1," each UPS determines that its own performance is in a "failure" condition and removes itself from the power source system (bus) through turning off (opening) the trip switch inserted in a main circuit in series. As a result, selective tripping for UPSs operated in a parallel redundancy condition is realized.

Related art 2
JP2006-109603A (related art 2) discloses that an output voltage (bridge voltage) $vi(t)$ of a semiconductor bridge configured for an inverter circuit of its own UPS instead of an inductor current $is(t)$ described above and the same type of formulas for determination are used to provide selective tripping of a UPS operated in a parallel redundancy condition. Specifically, each UPS determines its own failure by multiplying one cycle difference $\Delta v0(t)$ of the UPS output voltage $v0(t)$ and one cycle difference $\Delta vi(t)$ of the bridge voltage $vi(t)$ as shown in the following series of formulas:

$$\Delta v0(t):=v0(t)-v0(t-T0) \quad (4)$$

$$\Delta vi(t):=vi(t)-vi(t-T0) \quad (5)$$

if $\Delta v0(t)\times\Delta vi(t)>$threshold value, then Fault=1, else
Fault=0    (6)

Namely, in formula (6), when a left term value exceeds a threshold value, a value "1" as a fault signal is outputted. When a left term value does not exceed a threshold value, a value "0" as a fault signal is outputted. Therefore, when the Fault value is "1," each UPS determines that its own performance is in a "failure" condition and removes itself from the power source system (bus) through turning off (opening) the trip switch inserted in its main circuit in series.

A failed UPS must be immediately removed (tripped) from a power source system (bus) to prevent other "good" UPSs and a load device from affecting the system. Therefore, it is preferable that a time for determining performance failure by each UPS is as short as possible. However, in the above related art 1 and 2, even though UPSs are able to determine their own failure independently, they require a difference (amount of one cycle difference) between an output voltage at a certain time and a one cycle-delay signal of the output voltage, and so on for determining UPS performance failure. These related art references determine whether or not a UPS keeps operating in a good condition by comparing an internal signal at a certain time with a signal after one cycle from the internal signal. With respect to the related art using a one cycle-delay signal, since they need at least one cycle time (1/50 [sec] or 1/60 [sec]) of an operation frequency to determine UPS performance failure, there is a problem in which they cannot shorten a time required for selective tripping less than one cycle time.

SUMMARY

The present application is provided on the basis of the above situation. An object of the present application is to provide an uninterruptible power supply and a method for selective tripping of an uninterruptible power supply that determine UPS performance failure independently and perform selective tripping within a time shorter than one cycle time (1/50 [sec] or 1/60 [sec]) of an operation frequency.

In order to solve the problems mentioned above, an uninterruptible power supply according to the present application that converts a DC voltage to an AC voltage and that supplies the AC voltage to a load device. The uninterruptible power supply has a control unit configured to identify an internal impedance by using an instantaneous value of an internal voltage and current, and configured to perform a failure determination by detecting abnormal fluctuation of the identified value.

It is preferred that an uninterruptible power supply has an inverter unit that includes a semiconductor bridge circuit for generating a sinusoidal AC voltage by modulating the DC voltage with voltage instruction values and, and a filter circuit inserted between the semiconductor bridge circuit and the load device in series, and a trip switch for connecting and tripping the inverter unit to and from the load device with respect to the failure determination of the control unit.

It is preferred that the control unit further includes a system identification unit configured to obtain an unknown circuit constant of the inverter unit through a recursive identification process using known circuit information of the inverter unit, and a failure determination unit configured to generate a failure determination signal based on the unknown circuit constant obtained by the system identification unit.

It is preferred that the system identification unit uses the known information, which includes the voltage instruction values, the DC voltage, an output voltage of the inverter unit, and an inductor current flowing through an inductor in the filter circuit, to obtain an internal resistance of the inverter unit.

It is preferred that the recursive identification process uses a least squares method.

In order to resolve the above problems, a method for selective tripping of an interruptible power supply according to the present application in which an inverter unit converts a DC voltage to an AC voltage and that supplies the AC voltage to a load device, obtains an unknown circuit constant of the inverter unit through a recursive identification process using known circuit information of the inverter unit, generates a failure determination signal based on the unknown circuit constant, and trips the inverter unit from the load device by a trip switch when the failure determination signal indicates an failure occurrence signal.

It is preferred that the inverter unit includes a semiconductor bridge circuit for generating a sinusoidal AC voltage by modulating the DC voltage with voltage instruction values and a filter circuit inserted between the semiconductor bridge circuit and the load device in series, and obtains an internal resistance value of the inverter unit by using the voltage instruction values, the DC voltage, an output voltage of the inverter unit, and an inductor current flowing through an inductor in the filter circuit, as the known circuit information.

An uninterruptible power supply (UPS) and a method for selective tripping of an uninterruptible power supply according to the present application determine UPS performance failure independently and perform selective tripping within a fairly shorter time than one cycle time of an operation frequency.

BRIEF DESCRIPTION OF THE DRAWINGS

Specific embodiments of the present application will now be described, by way of an example only, with reference to the accompanying drawings in which.

DETAILED DESCRIPTION

A preferred embodiment of an uninterruptible power supply (UPS) according to the present application is explained with reference to the appended figures. A structure for one phase of one UPS is explained below. However, there is no limit to the number of UPSs according to one embodiment that could be operated in a parallel condition. A UPS according to one embodiment can be applied to a single phase power source system and a three-phase (multi-phase) power source system.

Figure 1:
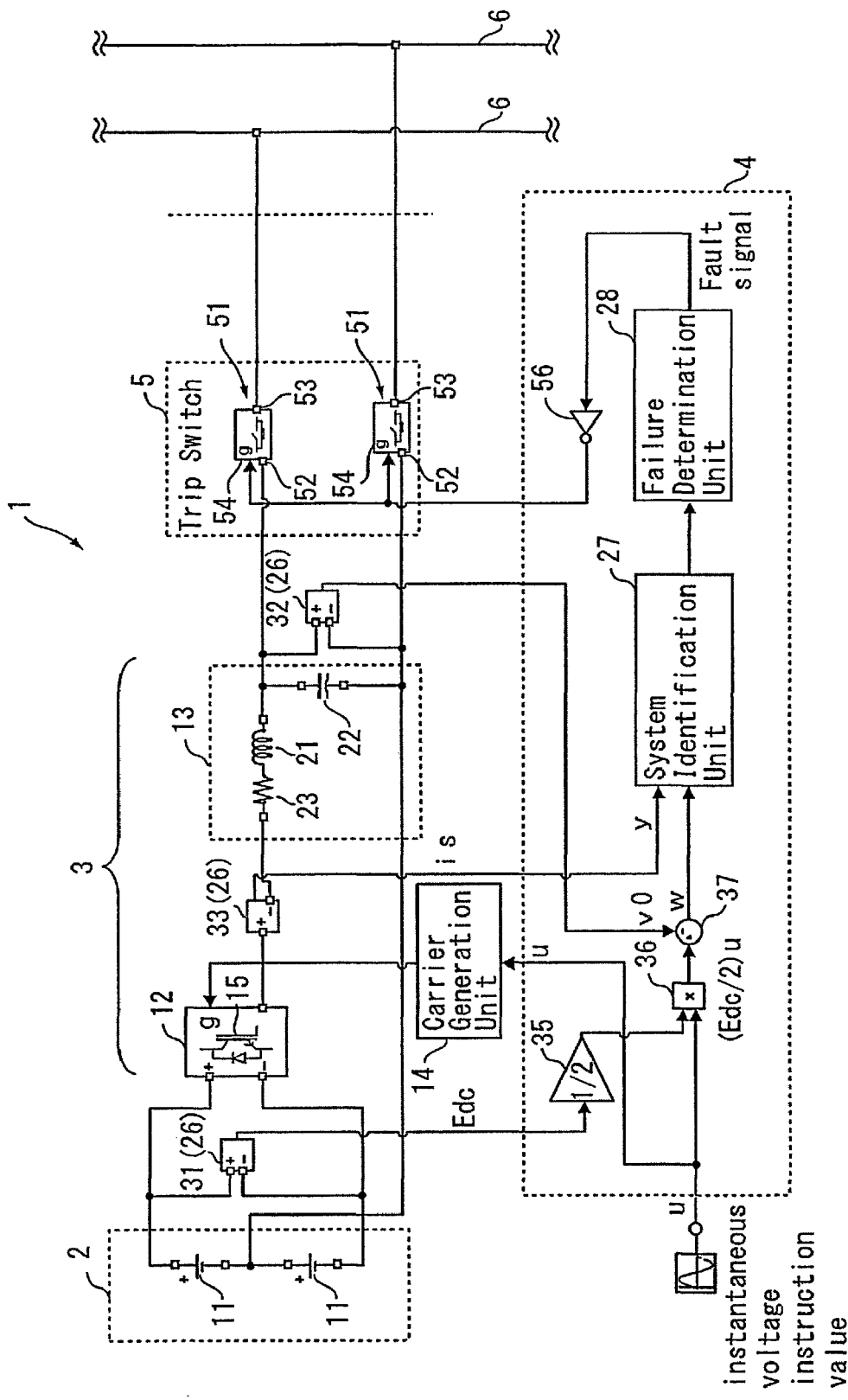
FIG. 1 is a block diagram showing a main structure of a UPS according to one embodiment of the present application.

FIG. 1 is a block diagram showing a main structure of an uninterruptible power supply (UPS) 1 according to one embodiment of the present application. A UPS 1 includes a direct-current (DC) power source unit 2, an inverter unit 3, a control unit 4, and a trip switch 5. The UPS 1 connects to other UPSs (not shown) and a load device (not shown) through bus lines of a power source system.

The DC power source unit 2 supplies power for a load device when fluctuation of power occurs, such as an electric power outage or a voltage drop, with respect to a commercial power sources to which the DC power source unit 2 connects through the bus lines 6. For example, the DC power source unit 2 is configured with a secondary battery that is charged by a trickle charge when the UPS 1 does not function as a backup power source. The DC power source unit 2 is configured with two DC power source parts 11 symmetrically connected to a reference potential to obtain a sinusoidal AC voltage through the inverter unit 3.

The inverter unit 3 of the UPS 1 includes a semiconductor bridge circuit 12 and a filter circuit 13. The semiconductor bridge circuit 12 generates a sinusoidal AC voltage by turning on and off a DC link voltage Edc of the DC power source unit 2 at a certain time ratio. Specifically, the DC link voltage Edc is converted into an AC voltage that is synchronized with a series of instantaneous voltage instruction values u (sine wave with 50 Hz or 60 Hz) by a pulse width modulation (PWM)

that varies a time ratio (duty ratio) of a carrier, which is generated by a carrier generation unit 14 and is inputted to a gate 15 of the semiconductor bridge circuit 12, with respect to the instantaneous voltage instruction value u. The semiconductor bridge circuit 12 is configured with a half-bridge circuit that uses, for example, a gate turn-off thyristor (GTO), an insulated gate bipolar transistor (IGBT), or a metal oxide silicon field effect transistor (MOSFET). A cycle length of a carrier outputted from the carrier generation unit 14 is required to be sufficiently small than a time constant of a circuit of the inverter unit 3, and therefore, it is, for example, a square wave with 20 kHz.

The filter circuit 13 is a filter that passes a frequency component (sine wave with 50 Hz or 60 Hz), which is supplied to a load device, among frequency components contained in a sinusoidal AC voltage outputted from the semiconductor bridge circuit 12 and that blocks a high-frequency component generated by the PWM in the semiconductor bridge circuit 12. The filter circuit 13 is provided in a main circuit located between the semiconductor bridge circuit 12 and the load device. The filter circuit 13 is configured with a filter inductor 21 provided in series in the main circuit and a filter capacitor 22 provided in parallel in the main circuit.

A control unit 4 of the UPS 1 includes a measurement input unit 26 determining its own operation performance, a system identification unit 27 identifying a circuit constant of a filter circuit, and a failure determination unit 28 generating a fault signal as a failure determination signal after detecting UPS performance failure.

The measurement input unit 26 detects an instantaneous value of an internal voltage and current of the UPS 1. The measurement input unit 26 includes a DC link voltage detection unit 31 detecting a DC link voltage Edc(t) as an instantaneous value, an inverter voltage detection unit 32 detecting an inverter voltage (output voltage) v0(t) as an instantaneous value, and an inductor current detection unit 33 detecting an instantaneous value is(t) of an inductor current is flowing through a filter inductor 21. The DC link voltage Edc(t) detected by the DC link voltage detection unit 31 is multiplied by ½ at an amplifier 35, and then it is multiplied by an instantaneous voltage instruction value u(t) at a multiplier 36. A product, {Edc(t)/2}×u(t), obtained by the multiplier 36 is inputted to a subtracter 37. The subtracter 37 subtracts an inverter voltage v0(t) obtained by the inverter voltage detection unit 32 from the product, {Edc(t)/2}×u(t), obtained by the multiplier 36 and outputs a remainder (difference) as an instantaneous voltage deviation signal w(t). Therefore, the instantaneous voltage deviation signal w(t) is represented in a time domain as the following formula:

$$w(t) = \{Edc(t)/2\} \times u(t) - v0(t) \quad (7)$$

A system identification unit 27 identifies a value rs, which is one of the circuit constants of a main circuit, of an internal resistance in an inverter unit 3 by using an instantaneous voltage deviation signal w(t) obtained through the measurement input unit 26 and an instantaneous value is(t) of an inductor current is obtained through an inductor current detection unit 33. When the inverter unit 3 is considered as a dynamic system, and its transfer function is G(s), the identification situation mentioned above is based on a relationship between input w(s) and output y(s) of the dynamic system that is as follows:

$$y(s) = G(s)w(s) \quad (8)$$

Here, "s" represents for a Laplace operator. In other words, according to a relationship in the above formula (8), the system identification unit 27 is a means for estimating a circuit constant of the inverter unit 3 by using measured input w(s) and output y(s).

Specifically, the system identification unit 27 estimates a parameter for a transfer function of the inverter 3 through system identification theory. For example, measurement input "w" and measurement output "y" are selected as the following formula:

$$w := (Edc/2) \times u - v0 \quad (9)$$

$$y := is \quad (10)$$

A transfer function of the inverter unit 3 is represented as the following formula:

$$G(s) := 1/(rs + sLF) \quad (11)$$

This is because a circuit equation for a circuit other than the control unit 4 is provided as "v1−v0=(rs+sLF)×is" showing in a Laplace transform. Here, v1 is a bridge voltage, "{Edc/2}× u." Based on these two formulas, an inductor current is "{1/(rs+sLF)}×{(Edc/2)×u v0}." Therefore, "G(s)" in formula (11) is obtained from formula (8), "w" in formula (9), and "y" in formula (10). "LF" is an inductance value of a filter inductor, and "s" is a Laplace operator.

The inverter unit 3, for which the system identification unit 27 conducts a system identification process, is used as a discrete system generating a sinusoidal AC voltage through turning on/off a DC link voltage Edc by a carrier from a carrier generation unit 14. When a cycle of a carrier, i.e., a sample cycle in a discrete system, is Ts, a transfer function G(s) in formula (11) showing in a Laplace transform is expressed with a "z transform" as the following formula:

$$G(z) = Ts/(LFz - LF + rsTs) \quad (12)$$

Here, "z" is an operator.

A transfer function G(z) in formula (12) with a z transform shows that the inverter unit 3, for which the system identification unit 27 conducts a system identification process, is treated as a first-order system. A transform function G(z) with a first-order system is generally expressed as the following formula:

$$G(z) = b/(z + a) \quad (13)$$

A value rs of the internal resistance 23 in the inverter unit 3 and an inductance value LF of the filter inductor 21 are obtained by comparing formulas (12) and (13) as shown in formulas below:

$$rs = (1 + a)/b \quad (14)$$

$$LF = Ts/b \quad (15)$$

Then, unknown parameters a and b are obtained through formulas (14) and (15) as follows:

$$a = -1 + (rsTs/LF) \quad (16)$$

$$b = Ts/LF \quad (17)$$

Unknown parameters a and b are referred to as an estimation parameter hereafter.

When a UPS 1 is in a "good" condition, the value rs of the internal resistance 23 in the main circuit given by formula (14) and the inductance value LF of the filter inductor 21 should be a number close to a nominal value. On the other hand, when some sort of failure occurs at the UPS 1, each of the numbers mentioned above varies greatly from a nominal value. Therefore, the UPS 1 is able to perform a failure determination based on a value of a circuit constant of the inverter unit 3. The value of a circuit constant of the inverter unit 3 is obtained through a system identification unit 27 with a recursive identification process that uses internal information of the inverter unit 3, such as a voltage instruction value u, a DC link voltage Edc, an output voltage of the inverter unit 3, and an inductor current is.

Figure 2:
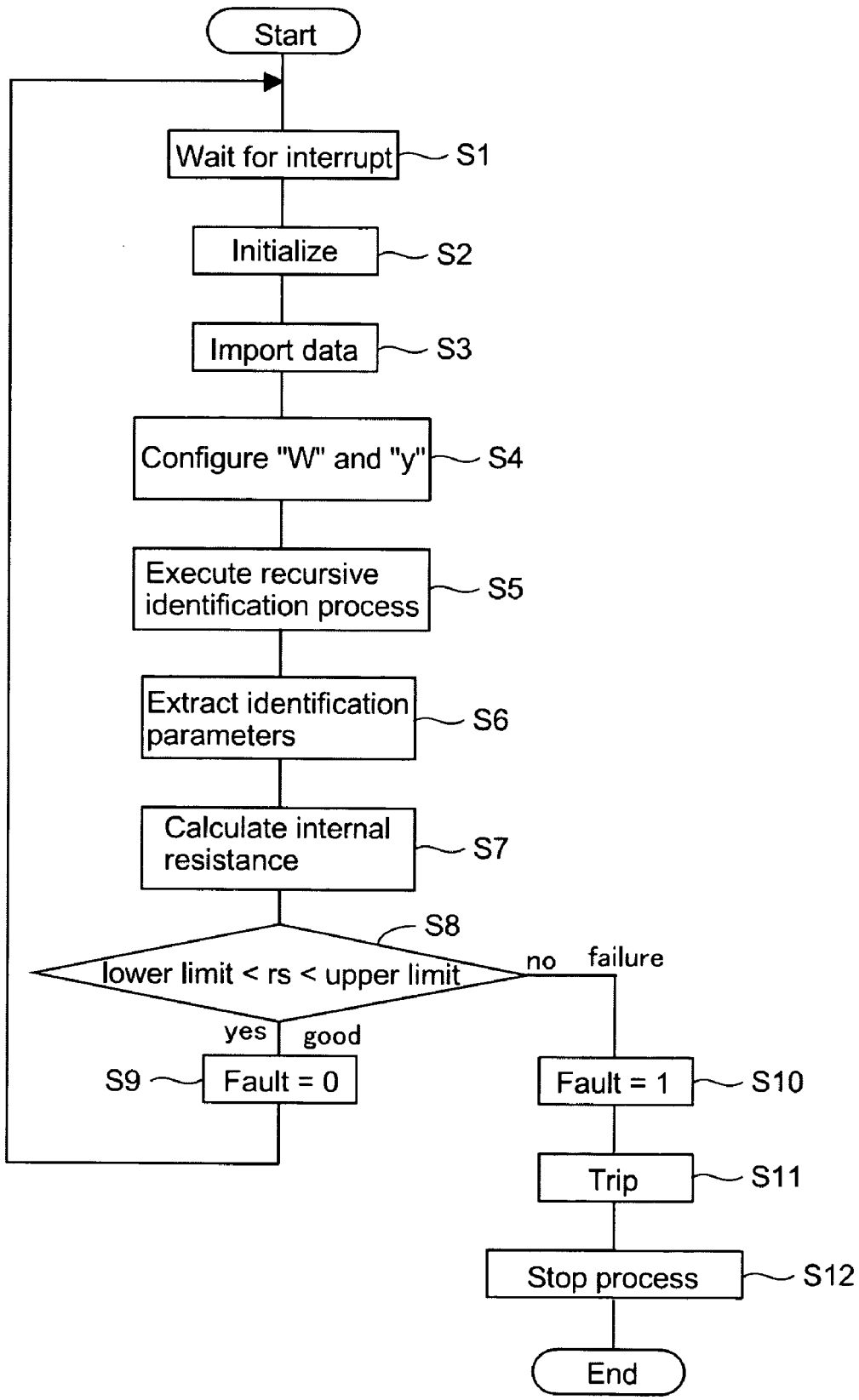
FIG. 2 is a flow diagram of system identification and a failure determination of a UPS according to one embodiment of the present application.

A detailed method of the recursive identification process in the system identification unit 27 discussed above is explained with reference to a flow diagram shown in FIG. 2 along with a block diagram of a UPS 1 in FIG. 1. It is not necessary that a process explained below is constantly conducted. It would be enough to repeat an interrupt processing at regular time intervals. An interval for the interrupt processing is the same as a sample cycle in an object system. The interval is typically equal to a cycle Ts of a carrier. The carrier is generated at a carrier generation unit 14 in the inverter unit 3 and is inputted to a gate 15 of a semiconductor bridge circuit 12. For example, when a frequency of a carrier in the inverter unit 3 is 20 [kHz], an interrupt processing is done every 50 [μsec].

First of all, after an interrupt waiting process is done for a time corresponding to a cycle Ts in S1, an initialization takes place in S2. This initialization is to assign initial values to parameters used for a system identification process. Specifically, initial values for a coefficient λ, a coefficient γ, a matrix P, a matrix θ, measurement input w, and measurement output y are respectively assigned below. Note that P is a 2-by-2 matrix, and θ is a 2-by-1 matrix. A first component in a upper low of θ is a parameter a in formula (16), and a second component in a lower low of θ is a parameter b in formula (17).

$$\lambda = 0.998 \tag{18}$$

$$\gamma = 100000 \tag{19}$$

$$P = y \begin{bmatrix} 1 & 0 \\ 0 & 1 \end{bmatrix} \tag{20}$$

$$\theta = \begin{bmatrix} -1 + rs0 \cdot TS/LF0 \\ TS/LF0 \end{bmatrix} \tag{21}$$

$$y\_1 = 0 \\ w\_1 = 0 \tag{22}$$

An initial value for the coefficient λ is a real number that is less than 1 and close to 1. An initial value for the coefficient γ is a real number and is preferably a large number. In a main circuit, an initial value rs0 of a value rs for an internal resistance 23 and an initial value LF0 of an inductance value LF of a filter inductor 21 are a nominal value, respectively. Initial values for the measurement input w and the measurement output y are initial values of previous samples (prior one sample). Each of parameters mentioned above is discussed later.

In S3, circuit information of the inverter unit 3 of a UPS 1 detected by the measurement input unit 26 is imported into the system identification unit 27. Specifically, an instantaneous value Edc(t) of a DC link voltage Edc, an instantaneous value v0(t) of an inverter voltage (output voltage), an instantaneous value is(t) of an inductor current is, and a sinusoidal instantaneous voltage instruction value u(t) are latched to be imported, respectively.

In S4, the measurement input w and the measurement output y are configured as follows:

$$w=(Edc/2)\times u-v0 \tag{23}$$

$$y=is \tag{24}$$

Next, in S5, a recursive identification process is executed, so that two unknown parameters a and b mentioned above are identified. Specifically, a recursive least squares method identification process is executed through the following estimate rule:

$$\zeta = \begin{bmatrix} -y\_1 \\ w\_1 \end{bmatrix} \tag{25}$$

$$e = y - \theta^T \zeta \tag{26}$$

$$P = \frac{1}{\lambda}\left[P - \frac{P\zeta\zeta^T P}{\lambda + \zeta^T P\zeta}\right] \tag{27}$$

$$\theta = \theta + P\zeta e \tag{28}$$

$$y\_1 = y \\ w\_1 = w \tag{29}$$

When a deviation (error) e is defined as formula (26) with respect to a matrix ζ for a measurement input/output parameter in formula (25) in which known parameters, the measurement input w and the measurement output y, are components, a parameter, which makes the deviation e minimum, is estimated by formula (27). A matrix θ as an estimate parameter in which unknown parameters a and b are components are sequentially updated through formula (28). The measurement input w and the measurement output y as a known parameter are sequentially updated through formula (29).

In S6, an identification value for unknown parameters a and b is extracted. As may be clear from formulas (16), (17), and (21), the parameter a is first component in the matrix θ, and the parameter b is second component in the matrix θ.

In S7, a value rs for the internal resistance 23 of the main circuit in the inverter unit 3 is calculated by using the parameters a and b that are identified in S6 as follows:

$$rs=(1+a)/b \tag{30}$$

Note that the above formula is the same as formula (14).

Next, in S8, failure determination of a UPS 1 occurs. A failure determination unit 28 executes a failure determination by using a value rs for the internal resistance 23 of the main circuit in the inverter unit 3 calculated through the system identification unit 27 in S7. Specifically, the failure determination unit 28 constantly monitors the value rs for the internal resistance calculated through the system identification unit 27 whether the value rs is between an upper limit and a lower limit. The failure determination unit 28 determines whether some sort of failure is occurred on the UPS 1 through a determination method as follows:

if lower limit<*rs*<upper limit, then Fault=0, else
  Fault=1 (31)

Namely, when the value rs is over the lower limit and is under the upper limit, a value "0" as a fault signal is outputted. When the value rs is not in the range mentioned above, a value "1" as a fault signal is outputted. When the value rs exists between the lower and upper limits, the failure determination unit 28 holds a value "0" of a fault signal outputted in S9. And then, an operation returns to S1, and an interrupt pending process is done. Alternatively, when the value rs is equal to or over the lower limit and is equal to or under the upper limit (lower limit≦rs≦upper limit), a fault signal "0" may be outputted, otherwise a fault signal "1" may be outputted. One of inequality signs located in a right part or a left part in formula 31 may be "≦," and another may be "<."

A lower limit and an upper limit for a value rs for the internal resistance 23 are assigned to an extreme value that cannot be assumed under the UPS 1's typical operation condition. For example, the lower limit is assigned to "0" assumed in case of short circuit failure. The upper limit is assigned to a rated value (i.e., rated voltage/rated current) assumed in case of breaking of wire. Under this setting, the failure determination unit 28 ensures failure determination.

In S8, when the value rs for the internal resistance 23 departs from the range discussed above, an operation goes to S10, and a value of a fault signal is changed to "1." Then, in S11, a UPS 1, which is determined as failure, is selectively tripped and departs from a parallel operation condition. The selective tripping is done by a trip switch 5. When an inputted value of a fault signal is "0," the trip switch keeps its close position and maintains a connection state between bus lines 6 of a power source system and a UPS 1. On the other hand, when a value of the fault signal is changed to "1," the trip switch becomes its open position, trips the main circuit, and removes the UPS 1 from the bus lines 6 of the power source system. A fault signal outputted from the failure determination unit 28 of the control unit 4 is inputted to the gate 54, 54 of each switch 51, 51 for the trip switch 5 that is inserted in series in the main circuit through an inverting amplifier (buffer) 56. An open-close function of the trip switch 5 is controlled by this fault signal. The switches 51, 51 in the trip switch 5 each have a first terminal 52, 52 connected to the UPS 1 and a second terminal 53, 53 connected to the bus lines 6. When the value of the fault signal is "0," the first terminals 52, 52 are each connected to respective second terminals 53, 53. When the value of the fault signal is "1," the first terminals 52, 52 are each isolated from respective second terminals 53, 53.

At last, in S12, an operation of the UPS 1, which is determined as failure and is removed from the power source system in S11, is stopped, and the series of processes are finished.

Figure 3:
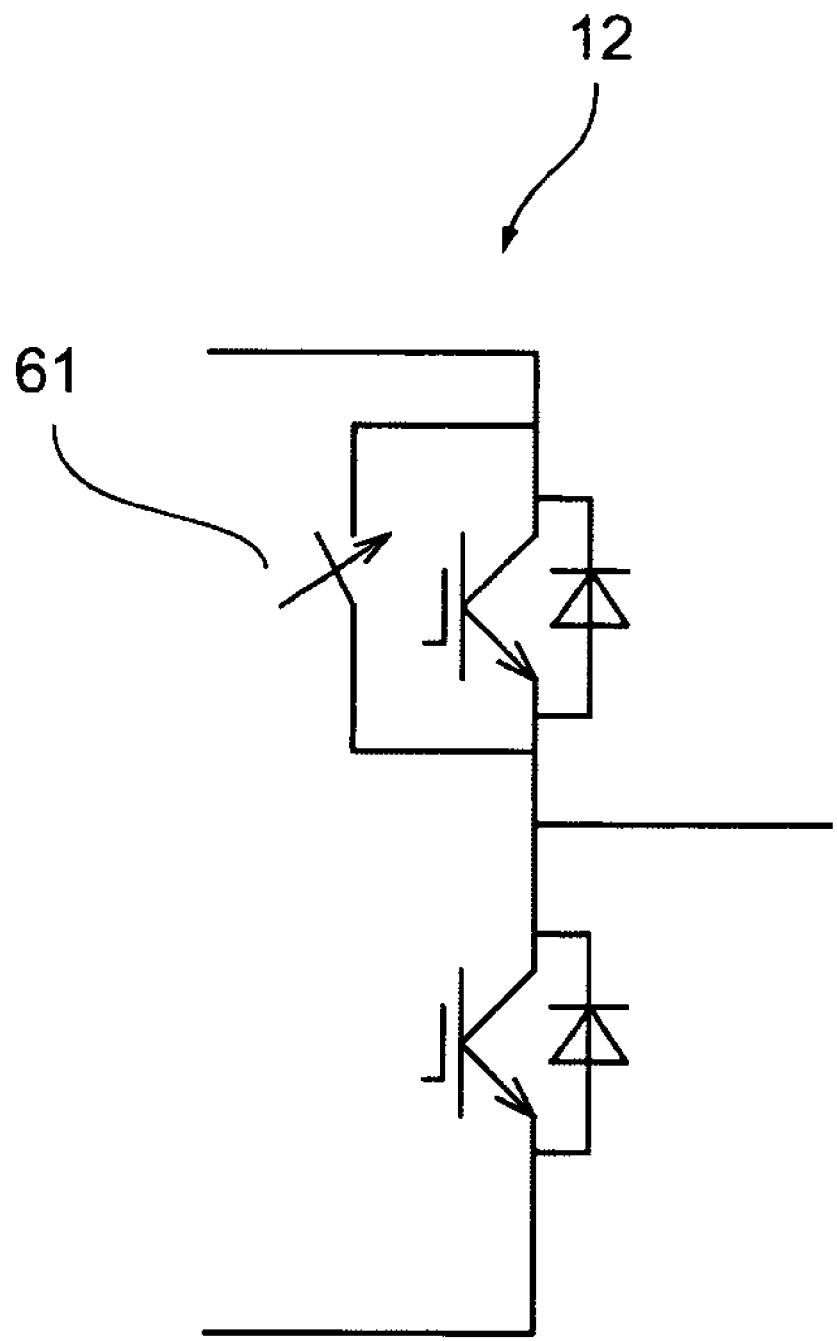
FIG. 3 is a schematic view of a short circuit switch simulating short circuit failure of a UPS according to one embodiment of the present application.

An operation of a UPS 1 according to one embodiment discussed above of the present application is explained with reference to simulation results. Simulations described below as an example assume that short circuit failure is sequentially occurred with respect to four UPSs 1 operating in a parallel redundancy condition. The short circuit failure of each UPS 1 is occurred by closing a short circuit switch 61 provided in parallel to an inverter as shown in FIG. 3. For example, one side (upper side, i.e., positive voltage side in FIG. 1) of a semiconductor bridge circuit 12 in an inverter unit 3 is shunted as a simulation.

Main circuit parameters used for simulations are described below. Since a load device is a resistance load, the load capacity for one UPS 1 is 2.5 [kW]. The inverter unit 3 is configured with a single phase half bridge. A frequency of a carrier of the PWM is 20 [kHz]. A basic frequency of an AC output is 50 [Hz]. Voltages (DC link voltages) of a DC power source for each of UPSs are as follows; 408 [V] for a first UPS, 449 [V] for a second UPS, 471 [V] for a third UPS, and 460 [V] for a fourth UPS. Circuit constants for a filter inserted into the main circuit of a UPS 1 are as follows; LF=640 [μH] (inductance value LF of filter inductor), rs=0.15[Ω] (value rs of internal resistance), and CF=20 [μF] (capacitance value CF of filter capacitor). These circuit constants are common among the first through the fourth UPSs. Note that a value calculated through the system identification unit 27 discussed above can be used as a value rs of the internal resistance 23.

Figure 4A:
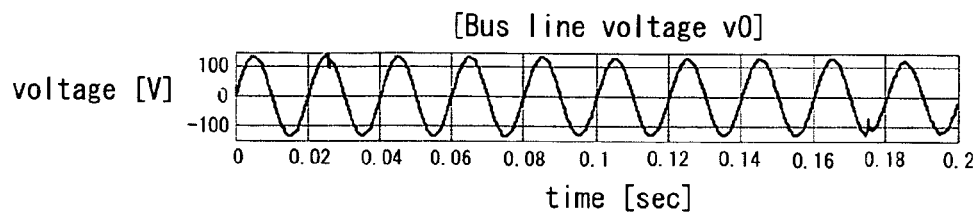
FIGS. 4A through 4E are views of simulation results of selective tripping operation under a parallel redundancy condition of a UPS according to one embodiment of the present application.

FIGS. 4A through 4E show simulation results in which circuit parameters described above are used. FIG. 4A shows a bus line voltage v0 in a power source system to which four of UPSs 1 are connected in parallel. FIG. 4B through 4E represent output currents i1, i2, i3, and i4 of the first UPS, second UPS, third UPS, and fourth UPS, of UPSs 1, respectively. In four UPSs 1 operating in a parallel redundancy condition, this simulation assumes the following short circuit failure cases: the first UPS is in short circuit failure after 0.025 [sec] from a reference time (0 [sec]); the second UPS is in short circuit failure after 0.09 [sec] from the reference time; and the third UPS is in short circuit failure after 0.175 [sec] from the reference time.

As shown in FIGS. 4A-4E, even though another UPS is in failure, each output current i1, i2, i3, and i4 of four UPSs 1 operating in a parallel redundancy condition is not changed; however, when its own UPS is in failure, the corresponding output current of the failed UPS immediately turns to 0 (zero). Even though each UPS 1 is tripped in the order of its occurrence of failure from the parallel redundancy operation, there is almost no change on a bus line voltage v0 because other "good" UPS(s) keep operating. By the results discussed above, it is understood that each UPS 1 operating in a parallel redundancy condition ensures selective tripping operation.

Figure 4B:
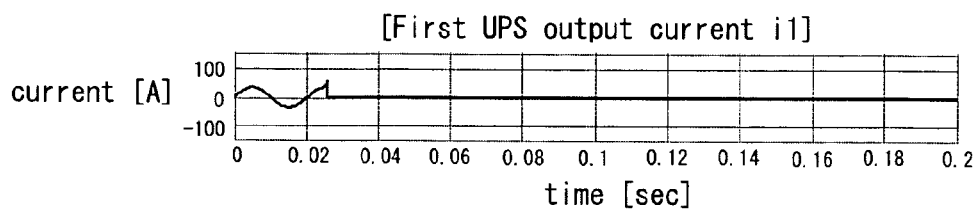
Figure 4C:
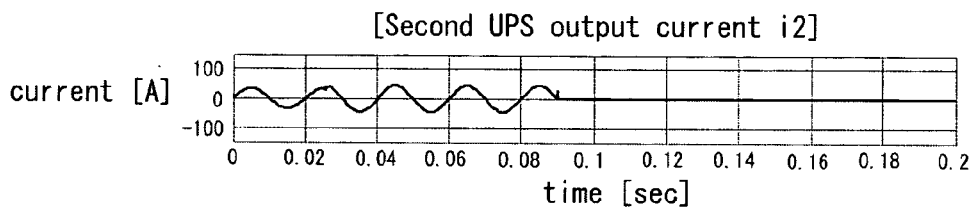
Figure 4D:
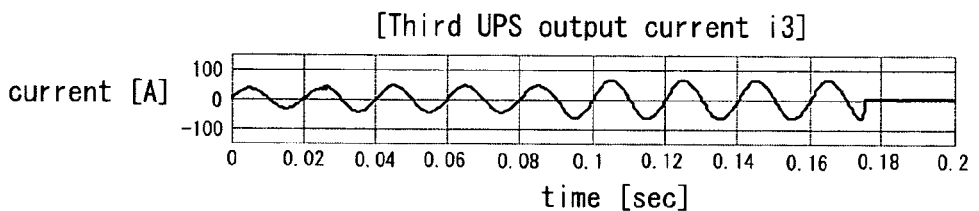
Figure 4E:
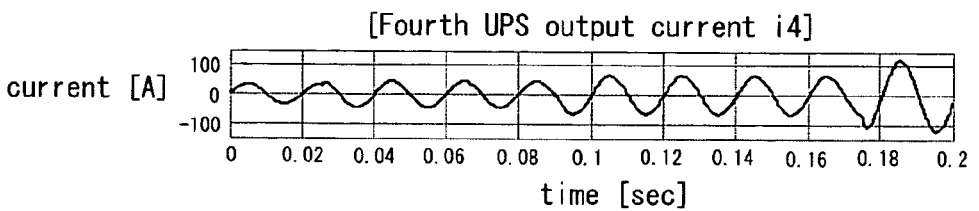
Figure 5A:
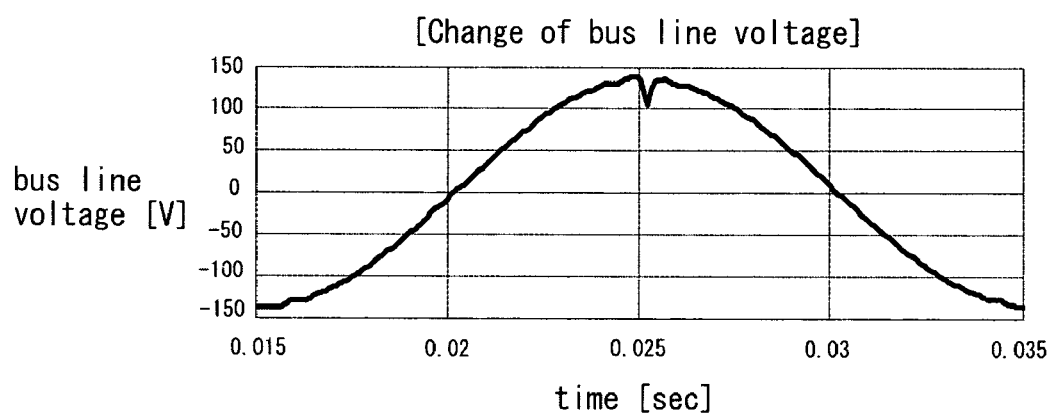
FIG. 5A is an enlarged view enlarging a part of a simulation result of FIG. 4A.
Figure 5B:
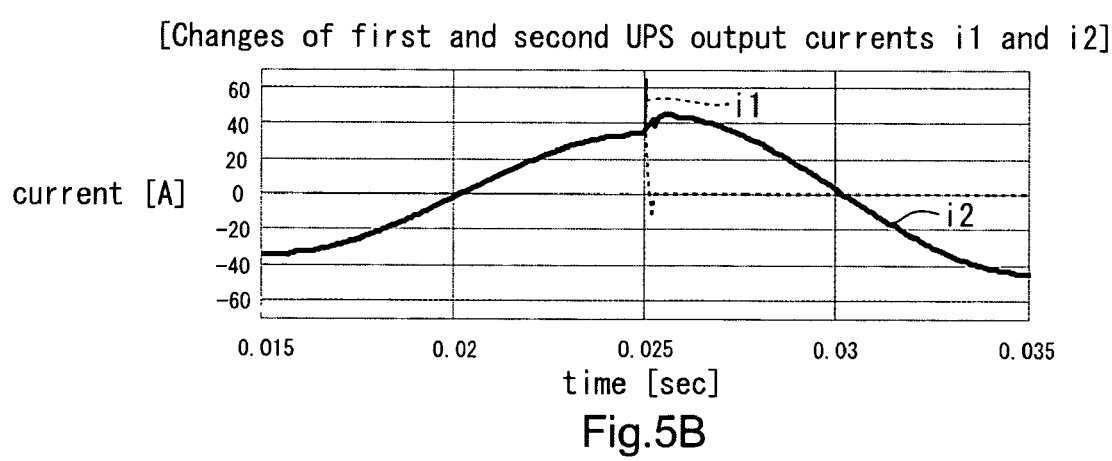
FIG. 5B is an enlarged view combining and enlarging a part of simulation results of FIG. 4B, according to one embodiment of the present application.

FIGS. 5A and 5B are enlarged views enlarging a part of a simulation result of FIGS. 4A-4C that relate to a bus line voltage v0, an output current i1 of the first UPS, and an output current i2 of the second UPS, respectively. When short circuit failure occurs in the first UPS at a timing of 0.025 [sec], an output current i1 of the first UPS is temporarily increased, and then turned to 0 (zero) because of selective tripping as shown in FIG. 5B. Even though the bus line voltage v0 is temporarily decreased a little bit as shown in FIG. 5A when the first UPS is selectively tripped from the operation in a parallel redundancy condition, there is almost no influence to the operation of the second UPS as a "good" UPS by its decrease. In this simulation, a time required from the occurrence of short circuit failure through the selective tripping is about 250 [μsec], i.e., about a 0.0125 cycle. Since a basic frequency of an AC output is 50 [Hz], one cycle is equal to ⅕₀ [sec]. By the results discussed above, it is understood that the UPS 1 according to one embodiment of the present application completes its selective tripping within a fairly shorter time than one cycle time of a basic frequency of an AC output.

Figure 6A:
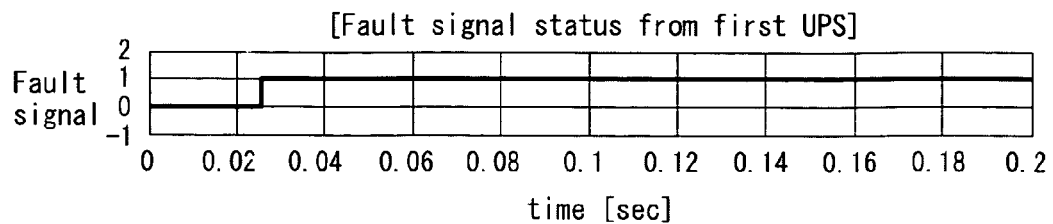
FIGS. 6A thorough 6D are views of simulation results of a fault signal of a UPS according to one embodiment of the present invention.
Figure 6B:
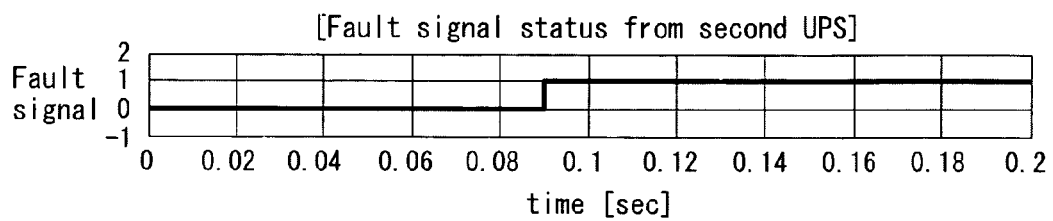
Figure 6C:
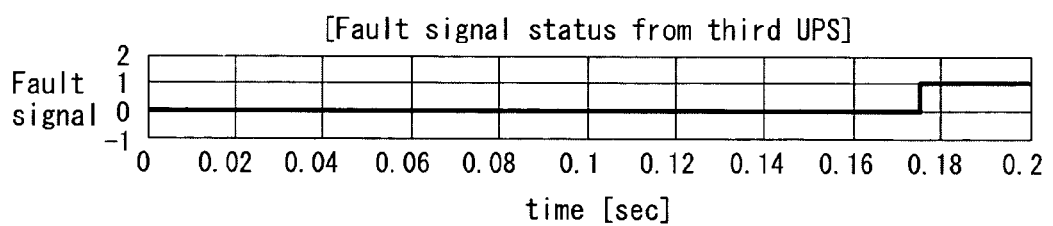
Figure 6D:
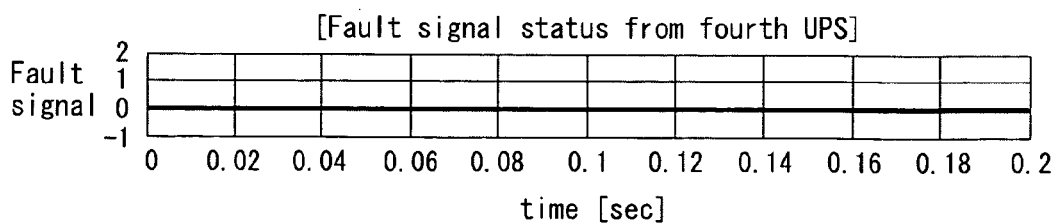

FIGS. 6A-6D show fault signal each of which is outputted from a failure determination unit 28 when short circuit failure is occurred in the respective UPS 1. A value of the fault signal for a first UPS shown in FIG. 6A is changed from "0" to "1" at the time of an occurrence of failure on the first UPS, 0.025 [sec]. A value of the fault signal for a second UPS shown in FIG. 6B is changed from "0" to "1" at the time of an occurrence of failure on the second UPS, 0.09 [sec]. A value of the fault signal for a third UPS shown in FIG. 6C is changed from "0" to "1" at the time of an occurrence of failure on the third UPS, 0.175 [sec]. A value of the fault signal for a fourth UPS, which is not in failure, shown in FIG. 6D remains the same value, "0." Note that a time required for selective tripping is equal to or less than 400 [μsec] in this simulation.

Figure 7:
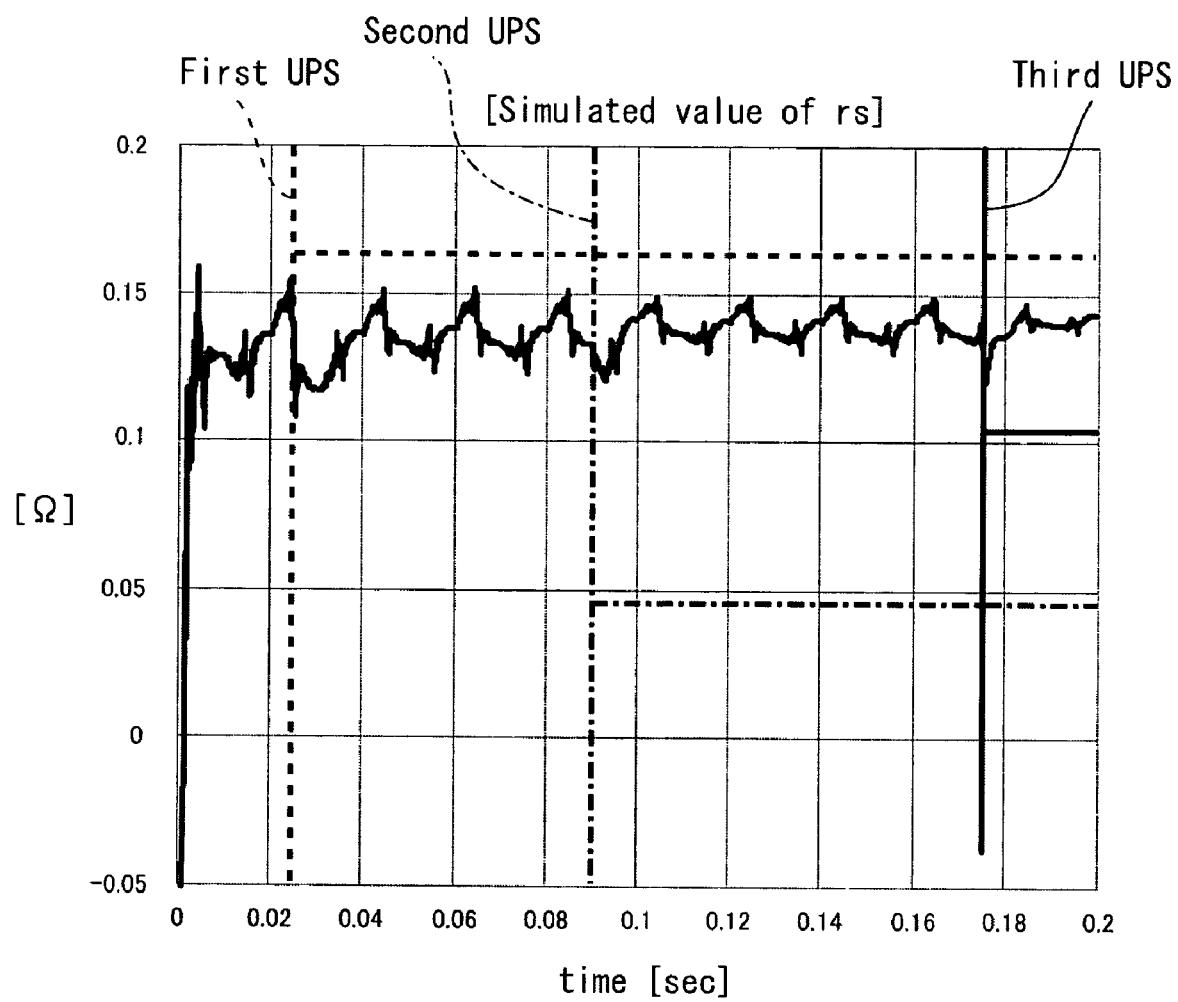
FIG. 7 is a view of a simulation result of an internal resistance in a main circuit of a UPS according to one embodiment of the present application.
Figure 8:
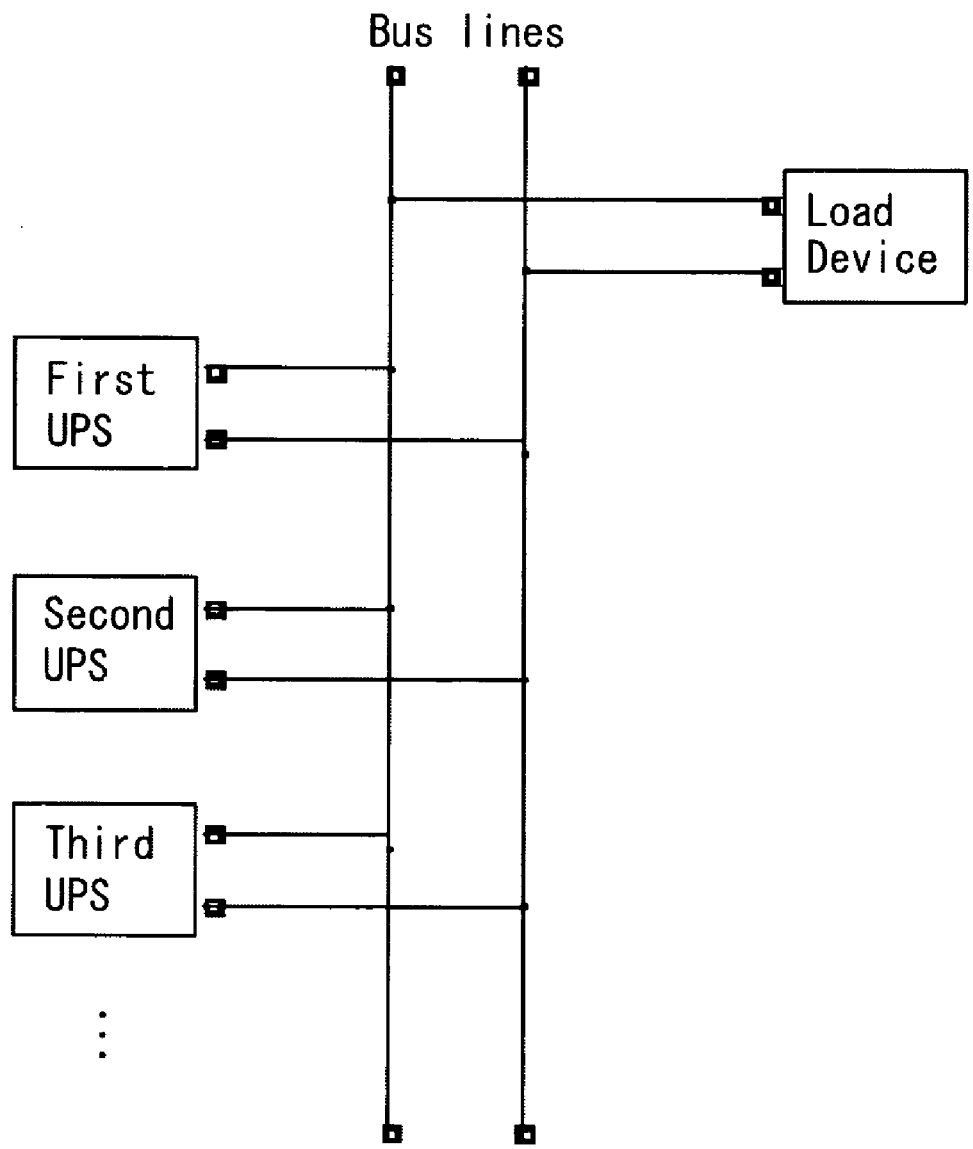
FIG. 8 is a schematic view of a UPS operating under a conventional parallel redundancy condition.

FIG. 7 shows a simulation result of a value rs of an internal resistance 23 in a main circuit in each UPS 1. Here, a line swinging between 0.10[Ω] and 0.15[Ω] represents an identification value of a value rs for the internal resistance 23 of the first through fourth UPSs. A dotted line shows that the first UPS departs from the then identification value. A dashed-dotted line shows that the second UPS departs from the then identification value. Vertical (upper to lower) and horizontal (left to right) lines shows that the third UPS departs from the then identification value. In each UPS 1 of the first through third UPSs, the value rs of the internal resistance 23 comes close to 0 (zero) at the instant of an occurrence of short circuit failure. By the results discussed above, it is understood that a failure determination operation is ensured by using the value (resistance) rs of the internal resistance 23 calculated through a system identification unit 27. A true value for the value rs of the internal resistance 23 is 0.15[Ω].

It is preferred that a circuit for a main part of a UPS 1 according to one embodiment of the present application is configured with a hardware (or a firmware) to obtain effects to the maximum extent possible, i.e., a failure determination and selective tripping can be performed at a faster pace by utilizing an instantaneous value of its own internal signal of the UPS 1. So long as a series of operations described in formulas (18)-(31) are realized, it does not matter about specific circuit structures. It can be decided in consideration with factors, such as a required time for operations, a degree of accuracy of operations, and ease of structures.

As explained above, a UPS 1 according to one embodiment of the present application can determine UPS performance failure with its own internal information, such as a voltage instruction value u, a DC link voltage Edc, an inverter voltage v0, and an inductor current is. Therefore, even though the UPS 1 operates along with other UPSs in a parallel operation condition, it is not necessary to use common information with other UPSs, and it is possible to determine UPS performance failure without influence from other UPSs. With respect to the UPS 1 according to one embodiment of the present application, since an instantaneous value of an internal voltage and current is used for determining UPS performance failure, selective tripping can be done within a fairly shorter time than one cycle time of a basic frequency (50 Hz or 60 Hz) of an AC output. This method discussed above is different from a conventional UPS that determines failure with a one cycle-delay signal. Further, while the UPS 1 is operating, it is possible to identify an unknown circuit constant through a recursive process.

A UPS 1 according to one embodiment of the present application is explained above. However, it should be appreciated that a wide variety of alterations and modifications are possible as far as they do not depart from the spirit and scope of the attached claims. For example, in the explanation above, a recursive process executing at a system identification unit 27 of a UPS 1 according to one embodiment of the present application is a least square method. Under this structure, a recursive identification process is easily executed compared with other system identification processes. Since there is no restriction with respect to a system identification process, several other identification processes, such as an extended least squares method, a generalized least-squares method, a bias compensation least squares method, an auxiliary variable method, and a prediction error method, can be used.

In the explanation above, it is assumed that a UPS 1 according to one embodiment of the present application operates along with other UPSs in a parallel operation condition. However, it is a matter of course that a UPS 1 according to one embodiment of the present application can operate alone without any other UPS. A UPS 1 according to one embodiment of the present application can operate along with another UPS having a different size of power source capacity from the UPS 1 in a parallel operation condition. In that situation, since the determination of UPS performance failure can be done independently, a stable parallel operation is accomplished.

The UPS 1 discussed above is an uninterruptible power supply that converts a DC voltage to an AC voltage and that supplies the AC voltage to a load device. The UPS 1 includes a control unit 4 that identifies the internal impedance (value rs of internal resistance 23) of the UPS 1 and that performs a failure determination by detecting abnormal fluctuation of the value. The control unit 4 can identify an inductance value LF as well. Therefore, a failure determination can be done by detecting a change of the inductance value LF.

The UPS 1 mentioned above has an inverter unit 3 that includes a semiconductor bridge circuit 12 for generating a sinusoidal AC voltage by modulating the DC voltage with voltage instruction values u and, and a filter circuit 13 inserted between the semiconductor bridge circuit 12 and the load device in series, and a trip switch 5 for connecting and tripping the inverter unit 3 to and from the load device with respect to the failure determination of the control unit 4. This trip switch 5 may be not only a mechanical switch being capable of a mechanical connecting and tripping, but also an electrical switch, such as a semiconductor switch being capable of an electrical connecting and tripping.

The control unit 4 of the UPS 1 discussed above further includes a system identification unit 27 configured to obtain an unknown circuit constant of the inverter unit 3 through a recursive identification process using known circuit information of the inverter unit 3, and a failure determination unit 28 configured to generate a fault signal based on the unknown circuit constant obtained by the system identification unit 27. The system identification unit 27 and the failure determination unit 28 are provided inside UPS 1. But they are provided outside UPS 1. The control unit 4 may be provided outside UPS 1 as well.

The system identification unit 27 uses the known information, which includes the voltage instruction value u, the DC voltage Edc, an output voltage v0 of the inverter unit 3, and an inductor current is flowing through a filter inductor 21 in the filter circuit 13, to obtain a value rs of an internal resistance 23 of the inverter unit 3. According to the above structure, since a value rs for the internal resistance 23 in the main circuit, which is used for a failure determination, is assigned to an extreme value that cannot be assumed under a typical operation condition, it is possible to ensure a failure determination operation and a selective tripping operation. In addition to these values, other values may be used, such as a simulated value is'(t) for an estimated value of an inductor current is generated with a circuit constant of the inverter unit 3. In that case, a fault signal is generated based on a deviation Δis(t) between an instantaneous value is(t) of the inductor current is flowing through the filter inductor 21 in the filter circuit 13 and the simulated value is'(t) for an estimated value of the inductor current is generated based on a circuit constant of the inverter unit 3. Therefore, two fault signals can be generated.

What is claimed is:

1. An uninterruptible power supply that converts a DC voltage to an AC voltage and that supplies the AC voltage to a load device, comprising:
    a control unit configured to identify an internal impedance by using an instantaneous value of an internal voltage and current, and configured to perform a failure determination by detecting abnormal fluctuation of an identified value of the internal impedance;
    an inverter unit that includes a semiconductor bridge circuit for modulating the DC voltage based on a predetermined voltage value and for generating a sinusoidal AC voltage, and a filter circuit inserted between the semiconductor bridge circuit and the load device in series; and
    a trip switch for connecting and tripping the inverter unit to and from the load device with respect to the failure determination of the control unit.

2. The uninterruptible power supply according to claim 1, wherein the control unit further comprises:
- a system identification unit configured to obtain an unknown circuit constant of the inverter unit through a recursive identification process using known circuit information of the inverter unit; and
- a failure determination unit configured to generate a failure determination signal based on the unknown circuit constant obtained by the system identification unit.

3. The uninterruptible power supply according to claim 2, wherein
the recursive identification process uses a least squares method.

4. The uninterruptible power supply according to claim 2, wherein
the system identification unit uses the known information, which includes the voltage instruction value, the DC voltage, an output voltage of the inverter unit, and an inductor current flowing through an inductor in the filter circuit, to obtain an internal resistance of the inverter unit.

5. The uninterruptible power supply according to claim 4, wherein
the recursive identification process uses a least squares method.

6. A method for selective tripping of an interruptible power supply in which an inverter unit converts a DC voltage to an AC voltage and that supplies the AC voltage to a load device, comprising:
- obtaining an unknown circuit constant of the inverter unit through a recursive identification process using known circuit information of the inverter unit;
- generating a failure determination signal based on the unknown circuit constant; and
- tripping the inverter unit from the load device by a trip switch when the failure determination signal indicates a failure occurrence.

7. The method for selective tripping of an uninterruptible power supply according to claim 6, wherein
- the inverter unit includes a semiconductor bridge circuit for generating a sinusoidal AC voltage by modulating the DC voltage with voltage instruction values and a filter circuit inserted between the semiconductor bridge circuit and the load device in series, and
- obtaining an internal resistance value of the inverter unit by using the voltage instruction values, the DC voltage, an output voltage of the inverter unit, and an inductor current flowing through an inductor in the filter circuit, as the known circuit information.

8. An uninterruptible power supply (UPS) comprising:
- a convertor configured to convert a DC voltage to an AC voltage;
- a supplier configured to receive the AC voltage from the convertor and to supply the AC voltage to a load device; and
- a control unit configured to have a system identification unit and a failure determination unit;
- an inverter unit configured to include the convertor and a filter circuit; and
- a trip switch for connecting and tripping the inverter unit to and from the load device with respect to the failure determination of the control unit, wherein
- the system identification unit identifies an internal impedance based on an instantaneous value of an internal voltage and current,
- the failure determination unit determines whether a UPS performance is indicative of failure based on the identified internal impedance and generates a failure determination signal based on its failure determination,
- the convertor includes a semiconductor bridge circuit for generating a sinusoidal AC voltage by modulating the DC voltage with voltage instruction values, and
- the filter circuit is inserted between the semiconductor bridge circuit and the load device in series.

9. The uninterruptible power supply according to claim 8, wherein
- the system identification unit is configured to obtain an unknown circuit constant of the inverter unit through a recursive identification process using known circuit information of the inverter unit; and
- the failure determination unit is configured to generate a failure determination signal based on the unknown circuit constant obtained by the system identification unit.

10. The uninterruptible power supply according to claim 9, wherein
the system identification unit uses the known circuit information, which includes the voltage instruction value, the DC voltage, an output voltage of the inverter unit, and an inductor current flowing through an inductor in the filter circuit, to obtain an internal resistance of the inverter unit.

11. The uninterruptible power supply according to claim 10, wherein
the recursive identification process uses a least squares method.

* * * * *